United States Patent
Hahn

(10) Patent No.: US 7,830,386 B1
(45) Date of Patent: Nov. 9, 2010

(54) REGISTER TRANSFER LEVEL SIMULATION USING A GRAPHICS PROCESSOR

(75) Inventor: Douglas J. Hahn, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 352 days.

(21) Appl. No.: 11/156,001

(22) Filed: Jun. 17, 2005

(51) Int. Cl.
*G06T 15/00* (2006.01)
*G06T 1/00* (2006.01)
*G06F 9/45* (2006.01)

(52) U.S. Cl. ............... 345/501; 345/419; 345/423; 345/502; 717/151

(58) Field of Classification Search ............ 345/501, 345/559, 952, 419, 26, 506, 582, 423, 502; 703/2, 13, 14, 15, 17; 712/1, 2, 7; 714/699, 714/714, 738, 748; 716/1, 4, 6, 16; 711/137; 717/151
See application file for complete search history.

(56) References Cited

U.S. PATENT DOCUMENTS

| | | | | |
|---|---|---|---|---|
| 5,870,308 A | * | 2/1999 | Dangelo et al. | 716/18 |
| 5,870,585 A | * | 2/1999 | Stapleton | 703/15 |
| 5,960,182 A | * | 9/1999 | Matsuoka et al. | 703/17 |
| 6,009,256 A | * | 12/1999 | Tseng et al. | 703/13 |
| 6,704,908 B1 | * | 3/2004 | Horan et al. | 716/1 |
| 6,816,828 B1 | * | 11/2004 | Ikegami | 703/15 |
| 6,876,362 B1 | * | 4/2005 | Newhall et al. | 345/426 |
| 7,065,481 B2 | * | 6/2006 | Schubert et al. | 703/14 |
| 7,268,785 B1 | * | 9/2007 | Glanville et al. | 345/506 |
| 7,523,023 B1 | * | 4/2009 | Koh et al. | 703/2 |
| 2002/0003541 A1 | * | 1/2002 | Boyd et al. | 345/501 |
| 2003/0069724 A1 | * | 4/2003 | Schubert et al. | 703/16 |
| 2004/0036692 A1 | * | 2/2004 | Alcorn et al. | 345/582 |
| 2005/0190189 A1 | * | 9/2005 | Chefd'hotel et al. | 345/501 |
| 2006/0050077 A1 | * | 3/2006 | D'Amora et al. | 345/567 |
| 2006/0098017 A1 | * | 5/2006 | Tarditi et al. | 345/505 |

\* cited by examiner

*Primary Examiner*—Amare Mengistu
*Assistant Examiner*—Aaron M Guertin
(74) *Attorney, Agent, or Firm*—Patterson & Sheridan, LLP

(57) ABSTRACT

Systems and methods for using a graphics processor as a coprocessor to a general purpose processor to perform register transfer level simulations may improve simulation performance compared with using only the general purpose processor. The internal state of memory elements of an RTL model of an electronic circuit are stored as surface data for each simulation timestep. Transform functions are used to determine a next state based on the current state and simulation inputs. The transfer functions are expressed as a graphics program, such as a shader or vertex program that may be executed by a programmable graphics processor.

17 Claims, 5 Drawing Sheets

PRIOR ART

REGISTER TRANSFER LEVEL SIMULATION USING A GRAPHICS PROCESSOR

BACKGROUND OF THE INVENTION

1. Field of the Invention

Embodiments of the present invention generally relate using a graphics processor as a coprocessor to perform register transfer level simulations of an electronic circuit.

2. Description of the Related Art

Conventionally, cycle based simulations, such as register transfer level (RTL) simulations are performed by a general purpose processor (CPU). FIG. 1 illustrates a prior art computing system, host computer 100, for performing RTL simulations, including a CPU, host processor 110. A system interface 115 couples host processor 110 to a host memory 120. Host memory 120 stores an RTL model of an electronic circuit, device under test 125, a testbench 130, simulation results 135, and simulation input 140. Testbench 130 provides a framework for device under test 125, providing clock signals, reset, and identifying other inputs and outputs. An RTL simulation is performed when host processor 110 executes a simulation application program, electronic design automation (EDA) application 145, providing simulation input 140 to device under test 125 via testbench 130. Output signals are produced for each specified timestep and stored as simulation results 135. Simulation results 135 may be displayed using a waveform viewer application or other application.

RTL simulations require a significant amount of host processor 110 computing cycles, making host processor 110 less available to other applications. Accordingly, there is a desire to offload a portion of RTL simulations in order to improve overall system performance or to complete the RTL simulations in less time.

SUMMARY OF THE INVENTION

The current invention involves new systems and methods for using a graphics processor as a coprocessor to perform register transfer level simulations of electronic circuits. The internal state of memory elements of an RTL model of an electronic circuit are stored as state variables in a graphics surface for each simulation timestep. Transform functions are used to determine a next state of the state variables based on the current state of the state variables and simulation inputs. The transfer functions are expressed as a graphics program, such as a shader or vertex program that may be executed by a programmable graphics processor. The transfer functions may be executed to generate state variables for one or more simulation timesteps.

Various embodiments of a method of the invention for performing register transfer level simulations using a programmable graphics processor are disclosed. The method includes translating transfer functions describing a register transfer level model of an electronic circuit into a graphics program, providing simulation inputs to the programmable graphics processor, and executing the graphics program on the programmable graphics processor using the simulation inputs and a current state of memory elements of the register transfer level model to produce a next state of the memory elements of the register transfer level model.

Various embodiments of a computer-readable medium containing a program which, when executed by a programmable graphics processor, performs a process for register transfer level simulation of an electronic circuit are disclosed. The process includes translating transfer functions describing a register transfer level model of the electronic circuit into a graphics program, providing simulation inputs to the programmable graphics processor, and providing the graphics program and the simulation inputs to the programmable graphics processor for execution to produce the register transfer level simulation of the electronic circuit.

Various embodiments of a system of the invention for performing simulations of a register transfer level model of an electronic circuit include a register transfer level compiler and a programmable graphics processor. The register transfer level compiler is configured to translate the register transfer level model of an electronic circuit into a graphics program. The programmable graphics processor is configured to execute the graphics program and produce state variables representing a next state of the register transfer level model of the electronic circuit that corresponds to a simulation timestep.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for using a graphics processor as a coprocessor to perform register transfer level simulations. The state of memory elements, e.g, registers, random access memory (RAM), flip-flops, or the like, specified by an RTL model of an electronic circuit are stored as graphics surface data and a current state of the memory elements is used to determine a next state of the memory elements. Transform functions are used to determine the next state based on the current state and simulation inputs. The transfer functions are expressed as a graphics program, such as a shader or vertex program that may be executed by a programmable graphics processor.

The transfer functions may be executed to generate several graphics surfaces, where each graphics surface includes a state of the memory elements for a particular timestep. The state of the memory elements stored in the graphics surfaces may then be displayed using a conventional waveform viewer or other application. Alternatively, when an RTL simulation is run without capturing the state of the memory elements of each simulation timestep, the next state may be stored in the same graphics surface, thereby overwriting the current state for each simulation timestep.

Figure 1:
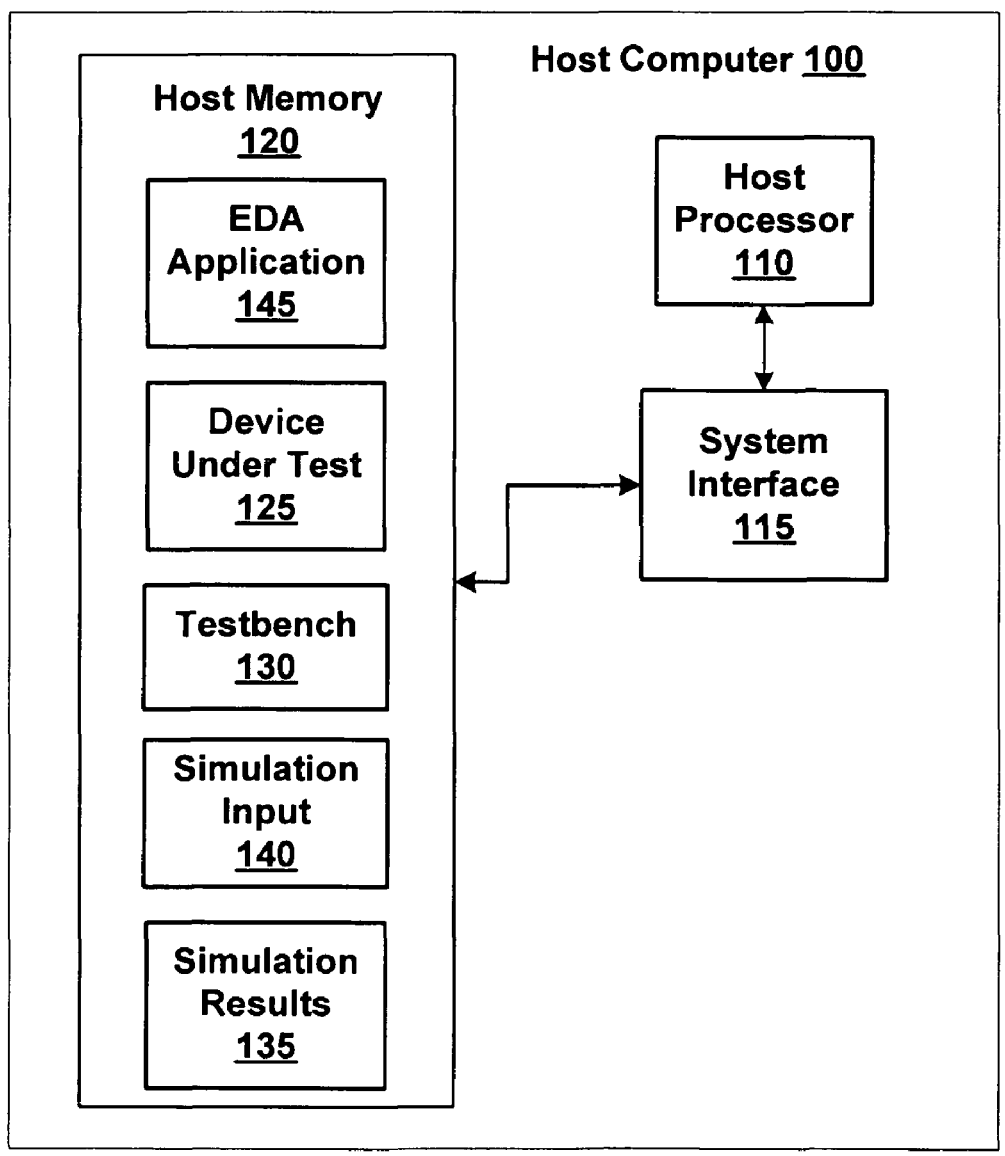
FIG. 1 illustrates a prior art computing system for performing cycle based simulations.
Figure 2A:
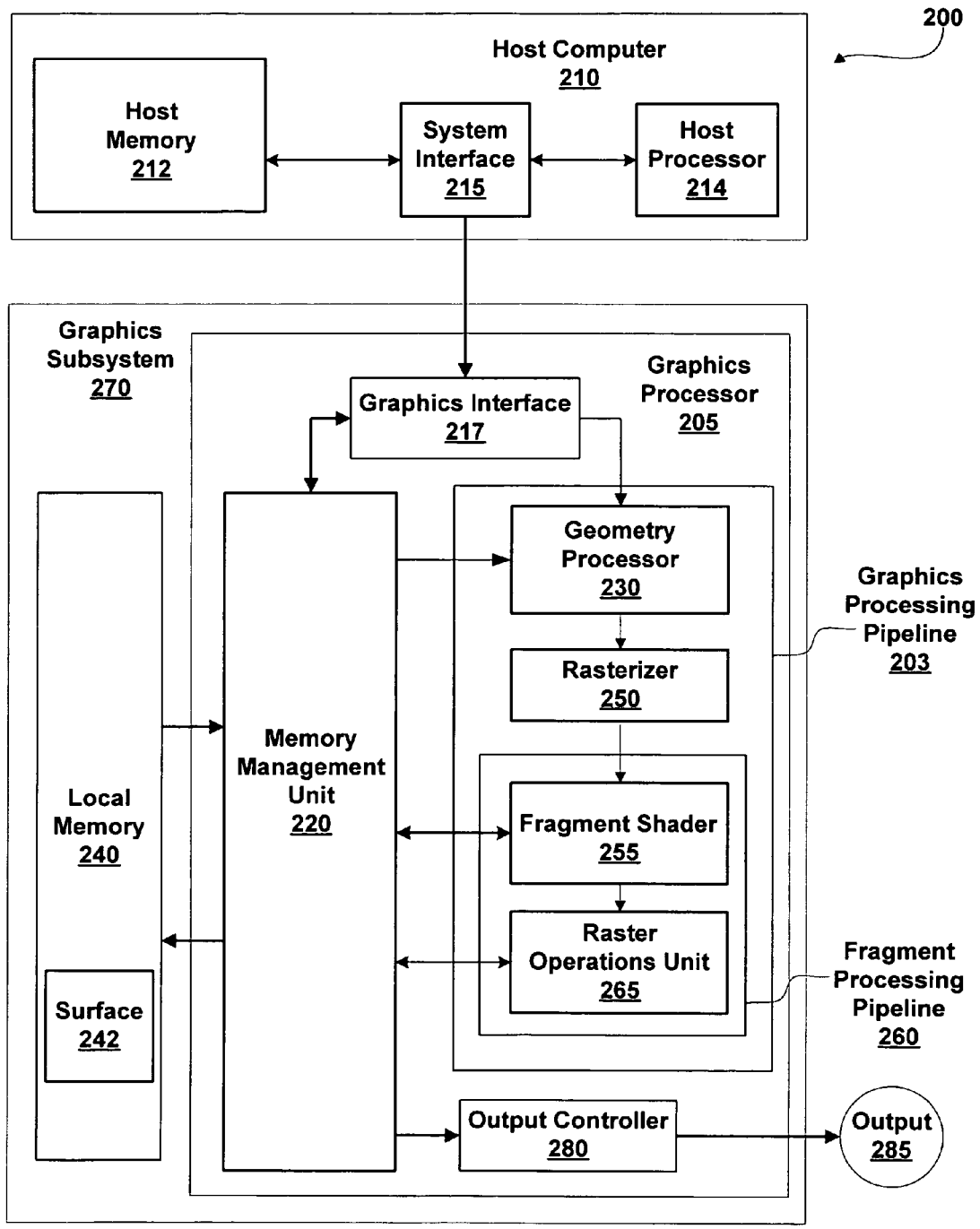
FIG. 2A is a block diagram of an exemplary embodiment of a respective computer system, including a host computer and a graphics subsystem, in accordance with one or more aspects of the present invention.

FIG. 2A is a block diagram of an exemplary embodiment of a respective computer system, including a host computer 210 and a graphics subsystem 270, in accordance with one or more aspects of the present invention. Computing system 200 may be a desktop computer, server, laptop computer, palm-sized computer, tablet computer, game console, portable wireless terminal such as a PDA or cellular telephone, computer based simulator, or the like. Host computer 210 includes host processor 214 that may include a system memory controller to interface directly to host memory 212 or may communicate with host memory 212 through a system interface 215 (as shown). System interface 215 may be an I/O (input/output) interface or a bridge device including the system memory controller to interface directly to host memory 212. An example of system interface 215 known in the art includes Intel® Northbridge.

Graphics subsystem 270 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics surface data, including texture maps, and program instructions, where graphics surface data is any data that is input to or output from computation units within programmable graphics processor 205. Graphics memory is any memory used to store data, e.g., graphics surface data, simulation inputs, or the like, or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory controller 220 and an output controller 280. Data and program instructions received at interface 217 can be passed to a geometry processor 230 within graphics processing pipeline 203 or written to local memory 240 through memory controller 220. In addition to communicating with local memory 240, and interface 217, memory controller 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled for execution within geometry processor 230 and rasterizer 250. Shader programs are sequences of shader program instructions compiled for execution within fragment processing pipeline 260. Geometry processor 230 receives a stream of program instructions (vertex program instructions and shader program instructions) and data from interface 217 or memory controller 220, and performs vector floating-point operations or other processing operations using the data. The program instructions configure subunits within geometry processor 230, rasterizer 250 and fragment processing pipeline 260. The program instructions and data are stored in graphics memory, e.g., portions of host memory 212, local memory 240, or storage resources within programmable graphics processor 205. When a portion of host memory 212 is used to store program instructions and data, the portion of host memory 212 can be uncached so as to increase performance of access by programmable graphics processor 205. Alternatively, configuration information is written to registers within geometry processor 230, rasterizer 250 and fragment processing pipeline 260 using program instructions, encoded with the data, or the like.

Data processed by geometry processor 230 and program instructions are passed from geometry processor 230 to a rasterizer 250. Rasterizer 250 is a sampling unit that processes primitives and generates sub-primitive data, such as fragment data, including parameters associated with fragments (texture identifiers, texture coordinates, and the like). Rasterizer 250 converts the primitives into sub-primitive data by performing scan conversion on the data processed by geometry processor 230. Rasterizer 250 outputs fragment data and shader program instructions to fragment processing pipeline 260.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. Fragment shader 255 outputs the shaded fragment data, e.g., color and depth, and codewords generated from shader program instructions to raster operations unit 265. When performing RTL simulations, fragment shader 255 processes fragment data, e.g., state variables representing the state of memory elements within a model of an electronic circuit. The current state variables are processed using the transfer functions and the simulation inputs for a particular simulation timestep to produce shaded fragment data, e.g., the next state variables. In other embodiments of the present invention, a vertex program is used to perform the RTL simulation and each state variable corresponds to a vertex or a vertex attribute that is processed by geometry processor 230 to produce next state variables.

Raster operations unit 265 includes a read interface and a write interface to memory controller 220 through which raster operations unit 265 accesses data stored in local memory 240 or host memory 212. Raster operations unit 265 optionally performs near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., simulation results are saved in graphics memory as surface data, such as surface 242 in local memory 240.

When processing is completed, an output 285 of graphics subsystem 270 is provided using output controller 280. Alternatively, host processor 214 reads the image stored in local memory 240 through memory controller 220, interface 217 and system interface 215. Output controller 280 is optionally configured by opcodes to deliver data to a display device, network, electronic control system, other computing system 200, other graphics subsystem 270, or the like.

Figure 2B:
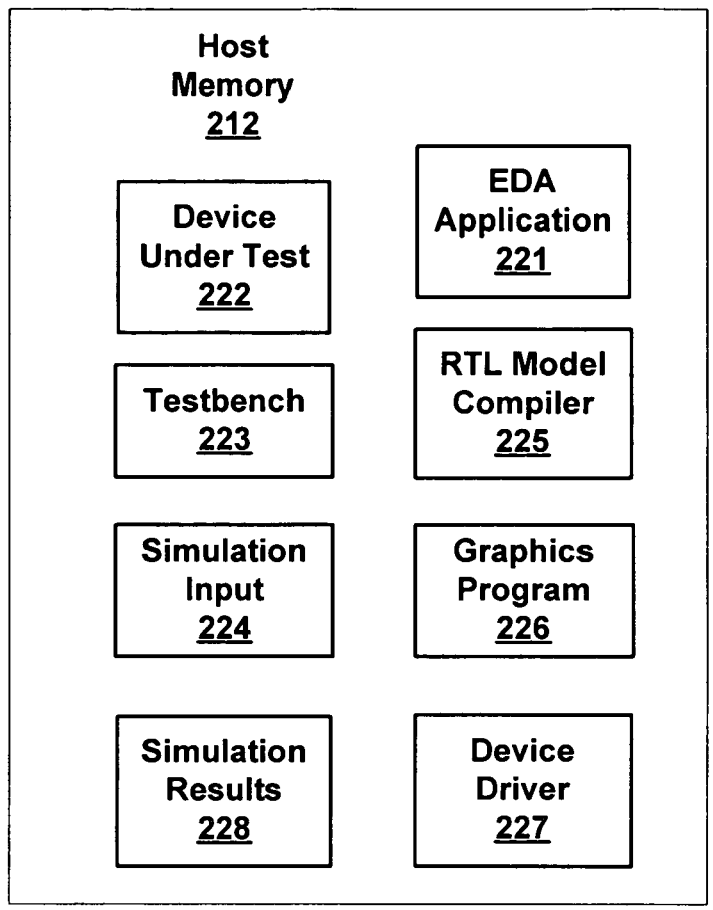
FIG. 2B is an exemplary embodiment of the host memory from FIG. 2A in accordance with one or more aspects of the present invention.

FIG. 2B is an exemplary embodiment of the host memory 212 from FIG. 2A in accordance with one or more aspects of the present invention. Host memory 212 stores an RTL model of an electronic circuit, device under test 222, a testbench 223, simulation results 228, and simulation input 224. An RTL simulation is performed when host processor 214 executes an EDA application 221, providing simulation input 224 to device under test 222 via testbench 223. Testbench 223 is executed by host processor 214 and provides a framework for device under test 222, providing clock signals, reset, and identifying other inputs and outputs. Testbench 223 and device under test 222 may be represented using a conventional RTL language such as VHDL or Verilog. Simulation input 224 provides signal levels for inputs of the RTL model of the electronic circuit for each timestep of the simulation. In some embodiments of the present invention, simulation input 224 is a sequence of test vectors.

An RTL model compiler, compiler 225 translates at least a portion of the RTL model of the electronic circuit, device under test 222 into a graphics program 226, producing shader or vertex program instructions for execution by a programmable graphics processor, such as programmable graphics processor 205. In some embodiments of the present invention, a portion of device under test 222 that is not designed for execution by a cycle based simulator is executed by host processor 214 and not translated into graphics program 226.

A graphics device driver, device driver 227, interfaces between processes executed by host processor 214, such as an EDA application 221, and a programmable graphics processor 205, translating program instructions generated by RTL model compiler 225 as needed for execution by programmable graphics processor 205. Programmable graphics processor 205 produces a graphics surface including state variables representing the state of each memory element of device under test 222 represented in graphics program 226 when simulation inputs 224 is applied for a particular timestep, as described in conjunction with FIG. 3.

Like a graphics surface including image data, a graphics surface including state variables may be stored in local memory 240 or stored in host memory 212 within simulation results 228. In some embodiments of the present invention, simulation results 228 are stored in local memory 240 and optionally copied to host memory 212. In other embodiments of the present invention, state variables are not retained for each simulation timestep and the current state variables are overwritten after they are used to compute the next state variables.

Figure 2C:
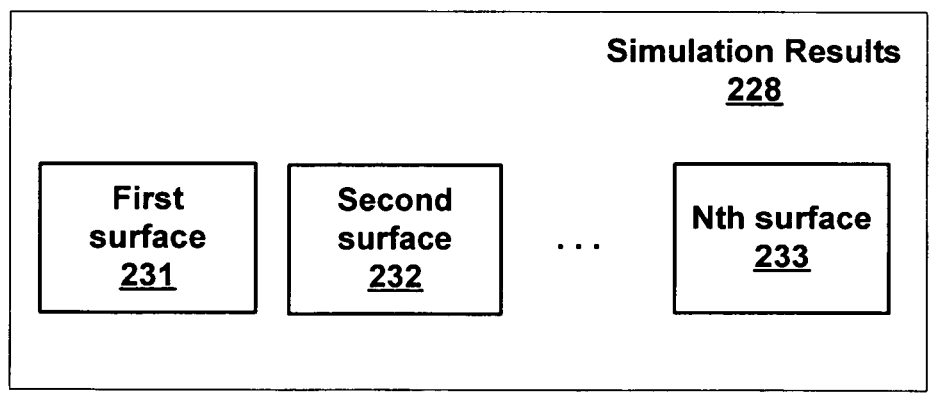
FIG. 2C is an exemplary embodiment of the simulation results from FIG. 2B in accordance with one or more aspects of the present invention.

FIG. 2C is an exemplary embodiment of the simulation results 228 from FIG. 2B in accordance with one or more aspects of the present invention. Simulation results 228 or any portion thereof, may be stored in graphics memory, such as local memory 240 or host memory 212. Simulation results 228 includes signal levels for each memory element of device under test 222 for each timestep of the simulation. State variables for each simulation timestep may be stored in a separate surface (as shown) or in a single surface.

A first surface 231 includes data representing the state of each memory element represented in graphics program 226 at the beginning of the simulation. First surface 231 may store the initial state of each memory element prior to starting the simulation, in which case, first surface 231 may be provided by RTL model compiler 225. Alternatively, the initial state of each memory element may be computed by programmable graphics processor 205 as the current state variables based on the simulation inputs at time=0.

A second surface 232 includes state variables representing the state of each memory element represented in graphics program 226 for a second timestep. Graphics program 226 uses first surface 231 as the current state of each memory element and combines the current state with simulation input for the current (first) timestep to produce the next state of each memory element, e.g., state variables stored in second surface 232. Likewise, graphics program 226 uses second surface 232 as the current state of each memory element and combines the current state with simulation input for the current (second) timestep to produce the next state of each memory element. Finally, graphics program 226 uses the n−1 surface as the current state of each memory element and combines the current state with simulation input for the current (n−1) timestep to produce the next (last) state of each memory element, e.g., state variables stored in Nth surface 233.

Figure 3:
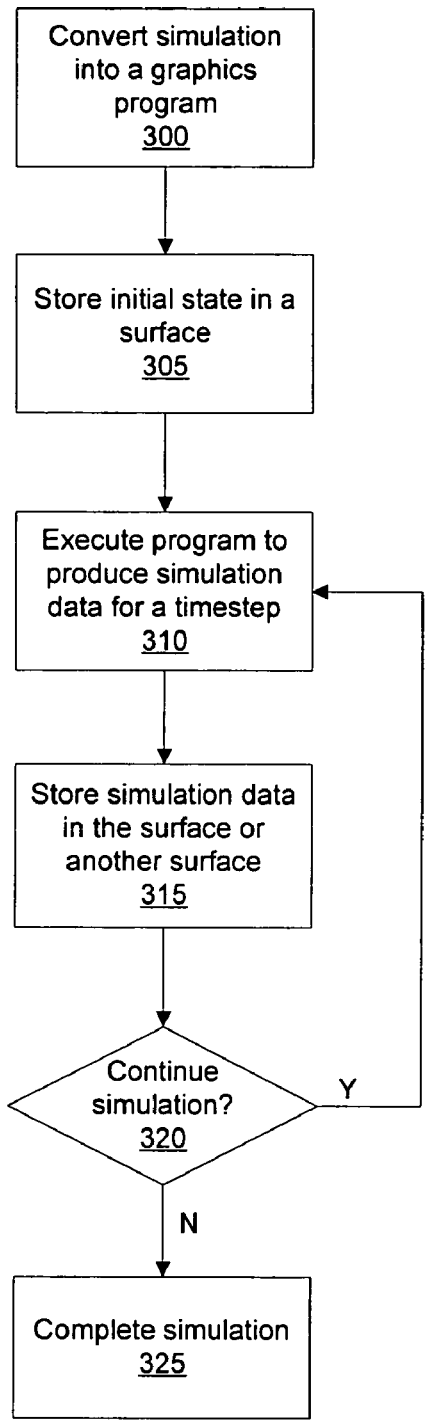
FIG. 3 illustrates an embodiment of a method for performing RTL simulations using a graphics processor in accordance with one or more aspects of the present invention.

FIG. 3 illustrates an embodiment of a method for performing RTL simulations using a graphics processor in accordance with one or more aspects of the present invention. In step 300 RTL model compiler 225 translates device under test 222 and testbench 223 into graphics program 226, such as a shader program or a vertex program, that may be executed by a programmable graphics processor, such as programmable graphics processor 205. In step 306 the initial state of device under test 222 is stored in a surface in graphics memory, for example as a texture map. In some embodiments of the present invention, the initial state may be stored as first surface 231 in graphics memory or surface 242 in local memory 240.

In step 310 device driver 227 provides graphics program 226 to programmable graphics processor 205 for execution and programmable graphics processor 205 produces simulation data for a timestep. In step 315 programmable graphics processor 205 stores the simulation data for the timestep in the graphics surface storing the initial state or in another graphics surface, such as second surface 232. Two or more graphics surfaces may store a sequence of state variables corresponds to a sequence of simulation timesteps. These graphics surfaces are suitable for display by a waveform viewing application to illustrate the signal levels of each state variable during any portion of the simulation. Alternatively, state variables may not be retained for multiple timesteps.

In step 320 device driver 227 or programmable graphics processor 205 determines if graphics program 226 should be executed again to produce state variables for additional timesteps. For example, a number of timesteps may be specified by simulation input 224 or an end condition may be evaluated to determine whether or not the simulation should continue. An end condition may be based on a particular memory element or group of memory elements are at a predetermined value, or have changed through a predetermined sequence of values, or the like. In some embodiments of the present invention, host processor 214 may terminate the simulation, indicating that the simulation completed successfully or that an error condition occurred.

If, in step 320 the method determines that the simulation should continue, then the method proceeds to repeat steps 310 and 315 to produce simulation data for another timestep and store the simulation data in yet another surface. If, in step 320 the method determines that the simulation should not continue, then the method proceeds to step 325 and the simulation is complete. A conventional EDA application, EDA application 221, may be used to view the simulation data for one or more timesteps by reading the data stored in surfaces produced and stored by programmable graphics processor 205. In some embodiments of the present invention, the surfaces are each stored as a texture map with a corresponding unique texture identifier. In other embodiments of the present invention, the simulation data for one or more timesteps is stored as a single surface. Persons skilled in the art will appreciate that any system configured to perform the method steps of FIG. 3 or its equivalent, is within the scope of the present invention.

Figure 4:
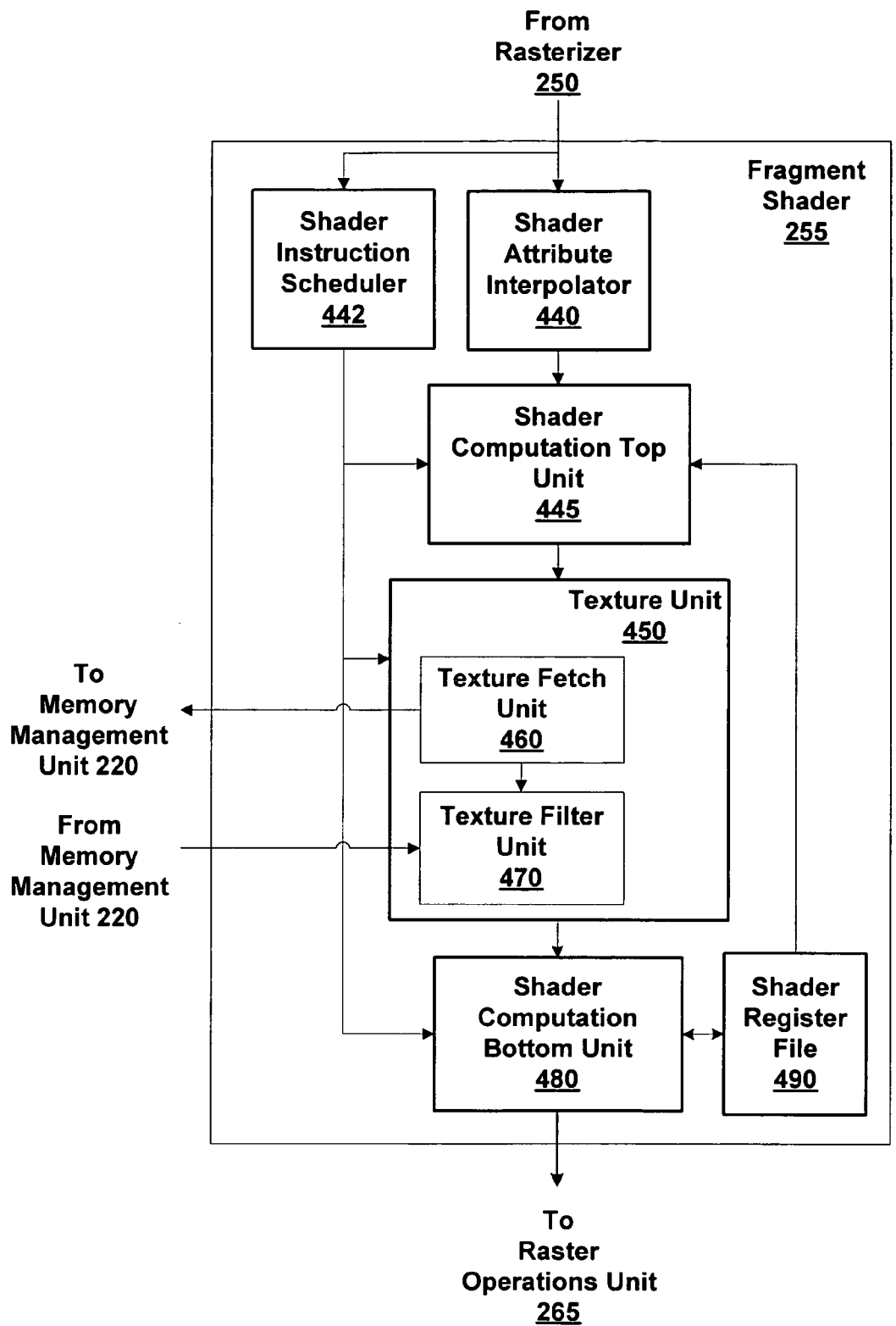
FIG. 4 is a block diagram of an exemplary embodiment of the fragment shader from FIG. 2A in accordance with one or more aspects of the present invention.

FIG. 4 is a block diagram of an exemplary embodiment of the fragment shader 255 from FIG. 2A in accordance with one or more aspects of the present invention. One or more fragment shader 255 may be included within fragment processing pipeline 260. Fragment shader 255 is configured to receive shader program instructions, simulation inputs, and current state variables that are processed according to the shader program instructions to produce next state variables. The shaded fragments are output to raster operations unit 265 of FIG. 2A.

A shader instruction scheduler 442 receives a sequence of program instructions and schedules each program instruction for execution by a processing unit in a processing pipeline, such as a shader attribute interpolator 440, a shader computation top unit 445, a texture unit 450, or a shader computation bottom unit 480. In some embodiments of the present invention, the sequence of program instructions are read by shader instruction scheduler 445 from local memory 240 via memory management unit 220 or via memory management unit 220 and a cache (not shown).

Shader attribute interpolator 440 produces interpolated attributes, such as texture coordinates, barycentric coefficients, depth (z or w), or the like, that may be sourced by the other processing units within fragment shader 255. Shader computation top unit 440 performs perspective correction of the interpolated attributes and other operations requiring division and multiplication. Texture unit 450 includes a texture fetch unit 460 and a texture filter unit 470. Texture fetch unit 460 computes texture map addresses and fetches texture data, e.g., current state variables or simulation inputs, via memory management unit 220. Texture filter unit 470 receives the texture data and filters the texture data to produce filtered texture data. When filtering using a point sample mode, the texture data is passed through texture filter unit 470 as the filtered texture data. Shader computation bottom unit 480 receives filtered texture data and interpolated attributes from texture unit 450 and produces shaded fragments. A shader register file 490 is a storage resource used to store temporary values needed during execution of the shader programs.

Each processing unit within fragment shader 255 is configured to execute specific program instructions. Shader instruction scheduler 442 schedules execution of each program instruction for execution by a processing unit that is configured to perform the operation(s) specified by the program instruction. For example, shader attribute interpolator 440 may be configured to perform operations including multiplication, division, and reciprocal. Texture unit 450 may be configured to perform operations including derivative calculations, texture addressing, and interpolation. Shader computation bottom unit 480 may be configured to perform operations including addition, cosine, sine, dot product, logarithm, and multiplication. In other embodiments of the present invention, additional processing units may be included in fragment shader 255.

Texture fetch unit 460 receives data, e.g., program instructions, and attributes associated with fragments (coverage information, texture identifiers, texture coordinates such as s, t, and r, and the like) from a rasterizer, such as rasterizer 250. Texture fetch unit 460 computes addresses based on the texture coordinates and texture identifiers and reads data from graphics memory via memory management unit 220. Each texture identifier may correspond to a particular graphics surface including state variables corresponding to a particular simulation timestamp, such as first surface 231, second surface 232, and Nth surface 233. A graphics surface may be read as a texture map to provide the current state of state of each memory element represented in graphics program 226, e.g., the current state variables. Specifically, each state variable may be stored as a texel or as a component of a texel. A data format may be specified for each graphics surface, so that each state variable may be represented as a fixed point or floating point value including 8 or more bits.

The current state texels read from graphics memory are received by texture filter unit 470 and are combined with the simulation input for the current simulation timestep to produce filtered texture data that are the next state values for each memory element represented in graphics program 226, e.g, next state variables. Graphics program 226 may be executed again to produce next state variables for another simulation timestep. In other embodiments of the present invention, the current state variables are processed by one or more other processing units within fragment shader 255, e.g., shader attribute interpolator 440, a shader computation top unit 445, or a shader computation bottom unit 480, to produce the next state variables. Finally, the next state variables are stored in graphics memory as a graphics surface, for example as a texture map corresponding to a particular texture identifier.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer system configured to perform register transfer level (RTL) simulations, comprising:
   a central processing unit (CPU);
   a host memory coupled to the CPU and including:
   an RTL model compiler configured for execution by the CPU to translate a first portion of an RTL model of an electronic circuit device under test and a testbench, each designed for execution by a cycle based simulator, into a graphics program that includes shader or vertex program instructions for execution by the programmable graphics processor, and
   a graphics device driver configured to provide the graphics program and simulation inputs to a programmable graphics processor;

a local memory coupled to the programmable graphics processor and including:
state information related to a current state of memory elements in the RTL model, and
state information related to a next state of the memory elements in the RTL model,
wherein the state information related the next state is stored in the local memory as state variables representing the state of each memory element of the electronic circuit device under test in a graphics surface, and
wherein a second portion of the RTL model that is not designed for execution by the cycle based simulator is not translated into the graphics program and is executed by the CPU; and
the programmable graphics processor that is configured by the graphics program to:
read the state information related to the current state of memory elements in the RTL model as texels of a first texture map from the local memory,
combine the texels with the simulation inputs for a current simulation timestep to produce filtered texture data that is next state values for each memory element of the electronic circuit device under test represented in the graphics program as the next state variables, and
store the next state variables in the local memory as a second texture map corresponding to a particular texture identifier.

2. The computer system of claim 1, wherein storing of the state information related to the next state overwrites the state information related to the current state.

3. The computer system of claim 1, wherein the graphics program is a shader program that represents the first portion of the RTL model of the electronic circuit device under test and the testbench, and fragment data represents the state variables.

4. The computer system of claim 1, wherein the graphics program is a vertex program that represents the first portion of the RTL model of the electronic circuit device under test and the testbench, and vertex data represents the state variables.

5. The system of claim 4, wherein the programmable graphics processor includes a geometry processor and a rasterizer, such that the vertex program is a sequence of instructions compiled for execution within the geometry processor and the rasterizer.

6. The computer system of claim 1, further comprising a waveform viewer application configured to display the state information related to the current state and the state information related to the next state.

7. The computer system of claim 1, wherein the host memory further comprises an electronic design automation (EDA) application, wherein the state information related to the current state is adapted for display using the EDA application.

8. The computer system of claim 1, wherein the state information related to the next state is stored in the local memory as a component of a texel in the second texture map.

9. The computer system of claim 7, wherein the EDA application is further configured to perform simulations of electronic circuits on the CPU, wherein the programmable graphics processor is used as a coprocessor.

10. A non-transitory computer-readable medium containing instructions that, when executed by a central processing unit (CPU), causes the CPU to perform a process for register transfer level (RTL) simulation of an electronic circuit, by performing the steps of:
translating a first portion of an RTL model of the electronic circuit device under test and a testbench, each designed for execution by a cycle based simulator, into a graphics program that includes shader or vertex program instructions using an RTL model compiler, wherein a second portion of the RTL model that is not designed for execution by the cycle based simulator is not translated into the graphics program and is executed by the CPU;
providing simulation inputs to a programmable graphics processor using a graphics device driver; and
providing the graphics program to the programmable graphics processor using the graphics device driver, wherein the programmable graphics processor is configured by the graphics program to:
read state information related to a current state of memory elements in the RTL model as texels of a first texture map from a local memory coupled to the programmable graphics processor;
combine the texels with the simulation inputs for a current simulation timestep to produce filtered texture data that is next state values for each memory element of the electronic circuit device under test represented in the graphics program as next state variables, wherein the state information related to the next state is stored in the local memory as state variables representing the state of each memory element of the electronic circuit device under test in a graphics surface; and
store the next state variables in the local memory as a second texture map corresponding to a particular texture identifier.

11. The computer-readable medium of claim 10, wherein the programmable graphics processor produces the state information related to the next state by applying transfer functions to the state information related to the current state and the simulation inputs.

12. The computer-readable medium of claim 10, wherein the state information related to the next state is stored in the local memory as a component of a texel in the second texture map.

13. The computer-readable medium of claim 10, wherein the storing of the state information related to the next state overwrites the state information related to the current state.

14. The computer-readable medium of claim 10, wherein the graphics program is a vertex program that represents the first portion of the RTL model of the electronic circuit device under test and the testbench, and vertex data represents the state variables.

15. The computer-readable medium of claim 10, further comprising executing an electronic design automation (EDA) application, wherein the EDA is configured to display the state information related to the current state.

16. The computer-readable medium of claim 14, wherein the programmable graphics processor includes a geometry processor and a rasterizer, such that the vertex program is a sequence of instructions compiled for execution within the geometry processor and the rasterizer.

17. The computer-readable medium of claim 15, wherein the EDA application is further configured to perform simulations of the electronic circuit on the CPU such that the programmable graphics processor is used as a coprocessor.

* * * * *